(12) United States Patent
Steiner

(10) Patent No.: US 11,576,522 B2
(45) Date of Patent: Feb. 14, 2023

(54) OPERATING UNIT FOR DISCHARGE OF STEAM FROM A COFFEE MACHINE

(71) Applicant: STEINER AG WEGGIS, Weggis (CH)

(72) Inventor: Adrian Steiner, Weggis (CH)

(73) Assignee: STEINER AG WEGGIS, Weggis (CH)

( * ) Notice: Subject to any disclaimer, the term of this patent is extended or adjusted under 35 U.S.C. 154(b) by 489 days.

(21) Appl. No.: 16/631,886

(22) PCT Filed: Jun. 8, 2018

(86) PCT No.: PCT/EP2018/065124
§ 371 (c)(1),
(2) Date: Jan. 17, 2020

(87) PCT Pub. No.: WO2019/015865
PCT Pub. Date: Jan. 24, 2019

(65) Prior Publication Data
US 2020/0146502 A1    May 14, 2020

(30) Foreign Application Priority Data

Jul. 20, 2017   (CH) .................................. 00945/2017

(51) Int. Cl.
*A47J 31/44*    (2006.01)
*A23L 2/54*    (2006.01)
(Continued)

(52) U.S. Cl.
CPC ............. *A47J 31/4489* (2013.01); *A23L 2/54* (2013.01); *A47J 31/4485* (2013.01);
(Continued)

(58) Field of Classification Search
CPC .......... A23L 2/54; A47J 31/4489; A47J 31/30
See application file for complete search history.

(56) References Cited

U.S. PATENT DOCUMENTS 9,907,426 B2 *   3/2018   Prefontaine ........... A47J 31/002
10,292,526 B2    5/2019   Fregman
(Continued)

FOREIGN PATENT DOCUMENTS

DE    4445436 A1    6/1996
EP    1656862 A1    5/2006
(Continued)

OTHER PUBLICATIONS

Abstract of DE 44 45 436 A1.

*Primary Examiner* — Robert A Hopkins
(74) *Attorney, Agent, or Firm* — Brian Roffe

(57) ABSTRACT

Operating unit for steam discharged from a steam lance in a controlled manner using a manually displaceable operating element. The operating element is displaced in one direction from an engaged starting position, in which there is no steam discharge, into engaged positions for discharge of determined amounts of steam, or displaced in the opposite direction, in which the amount of steam varies with the displacement. The operating element has a fixed casing, an outlet head displaceably mounted on the casing, a steam lance fastened to the head, and a displaceable casing including the operating element. The casing is engaged in the starting position or in the positions or can be displaced in the opposite direction, in which the steam is almost continuously variable. Milk froth is produced optimally according to the desired discharge type, in accordance with the amount of milk located in a cup.

20 Claims, 7 Drawing Sheets

(51) Int. Cl.
  *A47J 31/46* (2006.01)
  *A47J 31/36* (2006.01)

(52) U.S. Cl.
  CPC ........... *A23C 2210/30* (2013.01); *A47J 31/36* (2013.01); *A47J 31/4496* (2013.01); *A47J 31/469* (2018.08)

(56) References Cited

U.S. PATENT DOCUMENTS

| | | |
|---|---|---|
| 2015/0327715 A1 | 11/2015 | Steiner |
| 2017/0164644 A1 | 6/2017 | Steiner |
| 2018/0098659 A1 | 4/2018 | Steiner |
| 2018/0213969 A1 | 8/2018 | Fregnan |
| 2019/0008313 A1 | 1/2019 | Steiner |
| 2019/0008314 A1 | 1/2019 | Steiner |

FOREIGN PATENT DOCUMENTS

| | | |
|---|---|---|
| WO | 2010121299 A1 | 10/2010 |
| WO | 2015063742 A1 | 5/2015 |
| WO | 2019015865 A1 | 1/2019 |

* cited by examiner

OPERATING UNIT FOR DISCHARGE OF STEAM FROM A COFFEE MACHINE

FIELD OF THE INVENTION

The invention relates to a method for manually controlling an operating unit for the discharge of steam from a coffee machine, in which the steam discharged from a steam lance can be controlled by a manually displaceable operating element, wherein in one position the element occupies an engaged position, in which there is no steam discharged, and can either be displaced from that position to a engaged position, for the discharge of a specific quantity of steam, or can be substantially continuously displaced from that position for the adjustment of the quantity of steam, and an operating unit for implementing the method.

BACKGROUND OF THE INVENTION

For the production of steam, in particular in a coffee machine, it is known, as is disclosed in the published document DE 44 45 436, to control the quantity of steam supplied using a simple valve as a manual operating unit. The steam discharged is substantially used for the preparation of milk-containing coffee specialities, such as cappuccino, latte macchiato or coffee with milk, and thus used for the production of milk foam. The hot steam can be displaced or mixed with compressed air and added using a lance dipping to the milk or a vessel, so that the milk is heated up, forming the desired milk foam by up and down movements of the cup.

OBJECTS AND SUMMARY OF THE INVENTION

The object of the invention was to further develop a method for manual control as well as an operating unit for the delivery of steam from a coffee machine in such a way that the milk foam can be optimally produced in a quantity of milk, whether in a cup or the like, with a simple operation.

The object is solved according to the invention by a method for manually controlling an operating unit for the delivery of steam from a coffee machine or the like, in which the steam is delivered from a steam lance under control by a manually adjustable operating element. The operating element adopts a basic engaged position in which no steam is discharged and can either be adjusted from this position to a low position for the release of a specific quantity of steam, or the quantity of steam can be adjusted continuously. The operating element is adjustable from the basic engaged position in the direction of at least one engaged position for the delivery of at least a specific quantity of steam or in the opposite direction to that where the quantity of steam varies during adjustment. The object is also achieved by an operating unit for the discharge of steam which includes a fixed sleeve, an adjustable outlet head to which a steam lance is attached, and an adjustable sleeve with the operating element. Engaging means are provided, with which the sleeve is engaged with the operating element in the basic position or movable in one direction for the discharge of at least one specific quantity of steam or alternatively, movable in the opposite direction in which the quantity of steam is adjusted almost continuously.

In this manual control method in accordance with the invention, the operating element is adjusted from the basic position in one direction into at least one engaged position, to release at least a specific quantity of steam or, in the opposite direction, in which the quantity of steam varies with adjustment.

This method according to the invention is thus characterized by the fact that the milk foam can be optimally produced, depending on the desired mode of delivery, on the quantity of milk in a cup or similar container, in which on the one hand the milk is not heated up too quickly, and on the other hand, the foam can be formed when heated with an optimal consistency. For the manual movement in one direction, the operating element for the discharge of steam from a coffee machine is configured so that that it can be moved from a basic position, in which no steam is discharged, into at least one engaged position, which corresponds to a specific quantity of steam.

It is very advantageous for the temperature of the milk to be measured when the operating element is adjusted into this at least one engaged position and for the delivery of steam and the steam to be discontinued when the temperature of the milk reaches a target value. This ensures that the milk is not overheated and that it is always at the desired optimum temperature.

By the manual movement of the operating element in the opposite direction, the discharge of steam can be varied, preferably continuously, from a small quantity to a maximum quantity.

Further advantageous embodiments are defined in the dependent claims.

It is also particularly advantageous for optimal drinks to be produced simply using both the normal almost automated controls and the manual controls, even if different milk quantities, different final temperatures for different hot drinks ranges and/or variable milk foam consistencies exist or are to be achieved.

The operating element is preferably designed as a pivotable lever or a rotary knob. Further geometric shapes are conceivable for a possible embodiment of the operating element.

In a preferred embodiment, the operating element in combination with a pivoting steam lance is attached to the coffee machine and is optionally is mounted to be pivotable itself relative to the steam lance. This has the advantage that manual operation of the coffee machine is particularly simple.

Appropriately, a vent line is provided in the steam lance, which is connected via a valve to the interior of the coffee machine and is open there so that, with the valve open, air can flow from the interior of the coffee machine into the steam lance, to avoid a vacuum and consequently a backflow of milk into the steam lance, because the hot milk would cake and adhere in this and would clog it.

BRIEF DESCRIPTION OF THE DRAWINGS

The invention is explained in more detail in the following with the aid of exemplary embodiments, with reference to the drawing. It shows.

DETAILED DESCRIPTION OF THE INVENTION

Figure 1:
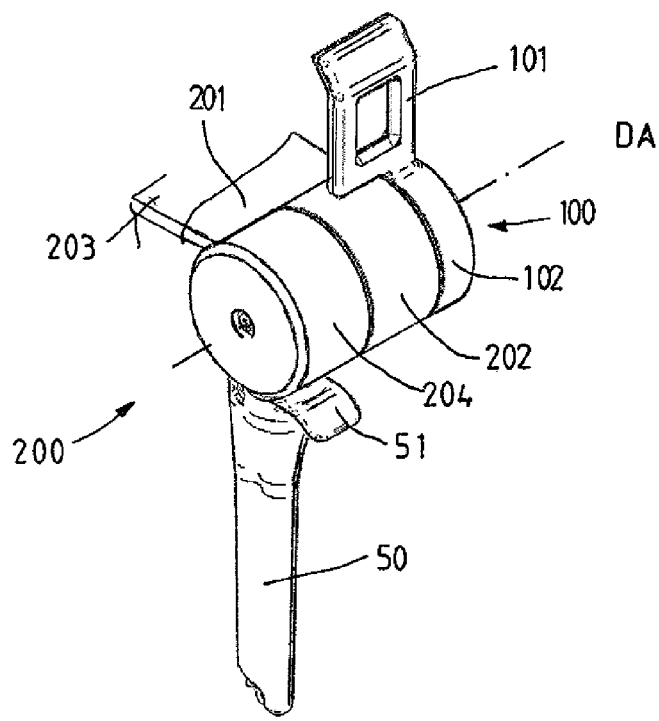
FIG. 1 is a perspective view of an operating unit in accordance with the invention with a steam lance on a coffee machine, not shown.

FIG. 1 shows an operating unit 100 on a coffee machine 200, not shown in detail, with a media supply line 203. This operating unit 100 comprises a first sleeve 202, an outlet head 204 with the attachable steam lance 50 and a second sleeve 102 with an operating element 101. The angled mount 201 is used to attach the sleeve 202 and thus the operating unit to the coffee machine 200.

Figure 2:
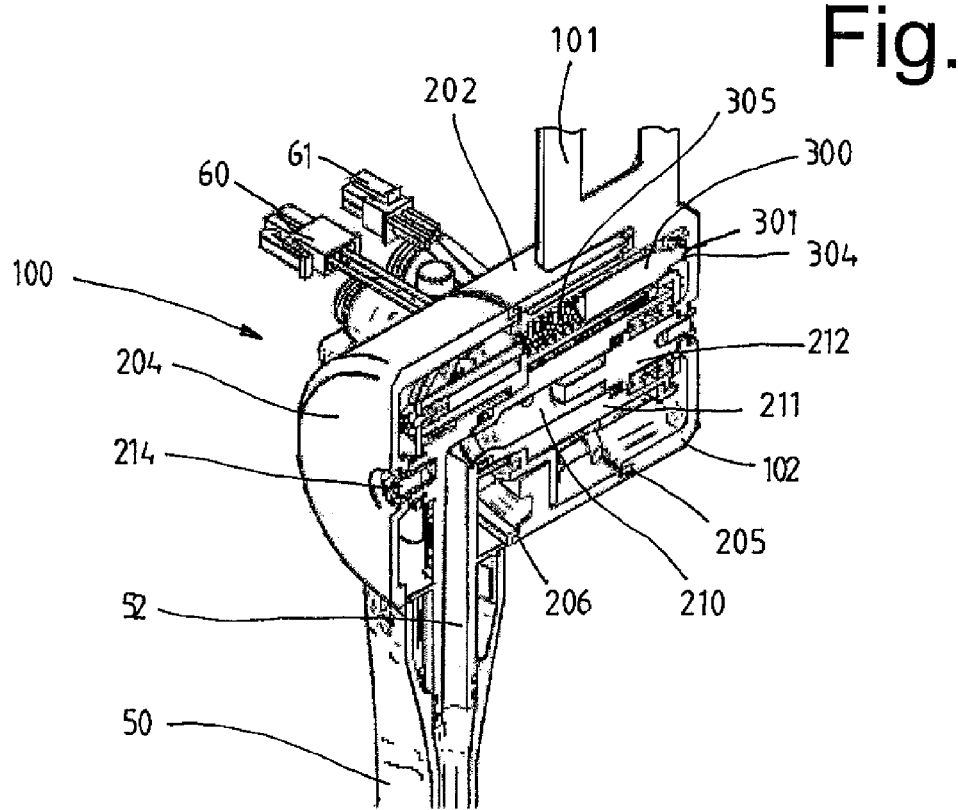
FIG. 2 is a longitudinal section of the operating unit according to FIG. 1.

According to FIG. 2, the outlet head 204 with the attached steam lance 50 and the sleeve 102 with the operating element 101 on opposite sides of the sleeve 202 are each mounted to be rotatable relative to the other by bearing rings 205, 206. A steam lance 50 with the handle 51 attached to the outlet head 204 is thus pivotable about a rotary axis DA pivotable relative to the sleeve 102 with the operating element 101. This allows a comfortable insertion or removal of this steam lance 50 in or out of a cup or a vessel, which vary in their size. After insertion, the milk in them can be heated or foamed.

In the center of the sleeves 102, 202, is a proportional valve 210 with a valve pin 212, which can be controlled with the operating element 101, for dispensing media from the media supply line 203 into the steam lance 50. The sleeve 102 with the operating element 101 is in the middle of the bearing ring 205 close to the sleeve 202. The sleeve 102 is mechanically connected to the valve pin 212 in the valve sleeve 211 of the proportional valve 210, so that the proportional valve 210 can be controlled with the operating element 101. The valve pin 212 closes the media supply line 203, partially, half or completely.

Figure 3:
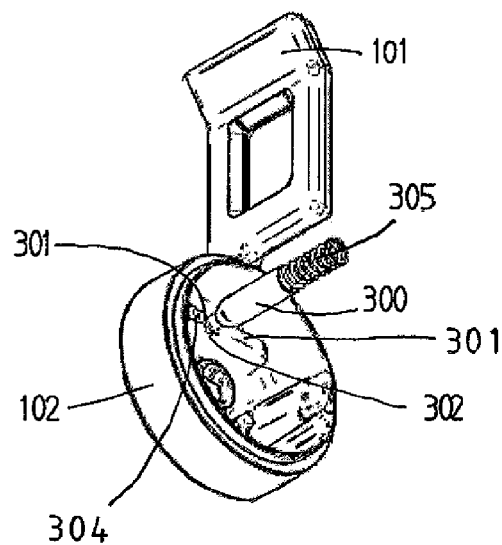
FIG. 3 is an interior view of a sleeve with the operating element of the operating unit according to FIG. 1.

In the context of the invention, the sleeve 102 has a profile 301, recognisable in FIG. 3, which is stepped in the direction of the rotary axis DA. It has a step-shaped progression 304, a partially sloped portion 303 and a step 302 for a basic position of the operating element, in which the proportional valve 210 closed and thus does not discharge any steam.

This profile 301 is thus operatively connected to a pin 300 applied with a spring 305, which form the engagement agents and through which the guide and snap-fitting functions for the operating element 101 are effected. This spring 305 and the pin 300, which it applied, are axially adjustable vertically in the fixed sleeve 202 perpendicular to the profile 301.

With this, in its longitudinal movable pin 300 could also be exercised an additional electrical function, for example in the form of a position sampling or the like for an electrical control of the proportion valve 210 with a motor or an actuator.

Ideally, the concealed profile 301 has a partially stepped course 304 with a variety of steps for preset positions, which correspond to a variety of different desired steam levies.

In addition, the profile 301 has a ramp-shaped course 303, through which variable positions of the operating element 101 result, in which the vapour output by the proportional valve 210 is not determined by a preset position, but infinitely variable can be adjusted and the quantity of steam is manually adjusted or changed. The ramp-shaped course 303 of the profile 301 together with the spring 305 and the pin 300 causes the sleeve and with it the operating element 101 when release the same after a pivoting movement automatically back into the basic position with closed valve for the steam is moved.

Figure 4:
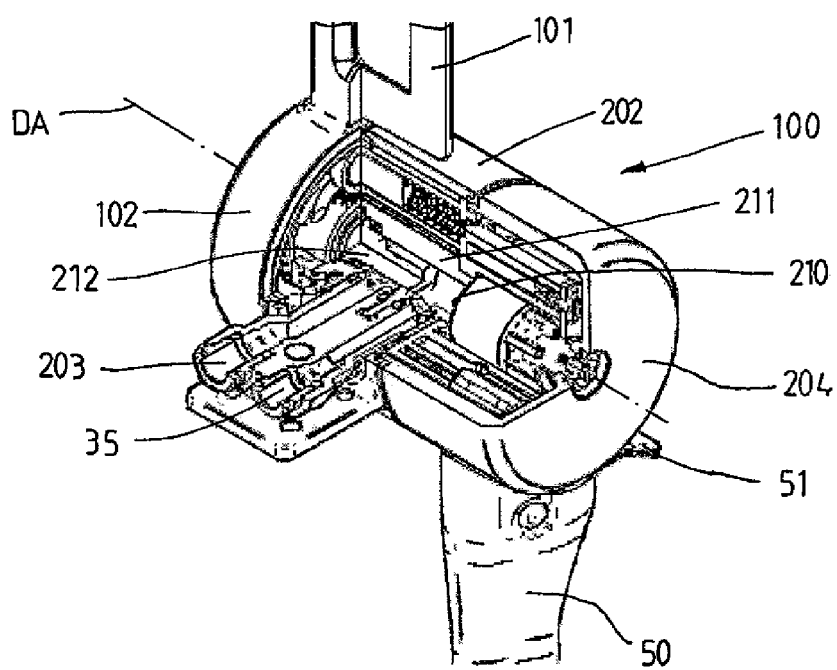
FIG. 4 is a partial section of the operating unit according to FIG. 1.

FIG. 4 shows the media supply line 203 for the steam and/or air in the operating unit 100 as well as a vent line 35 leading into the coffee machine, which is explained below.

Figure 5:
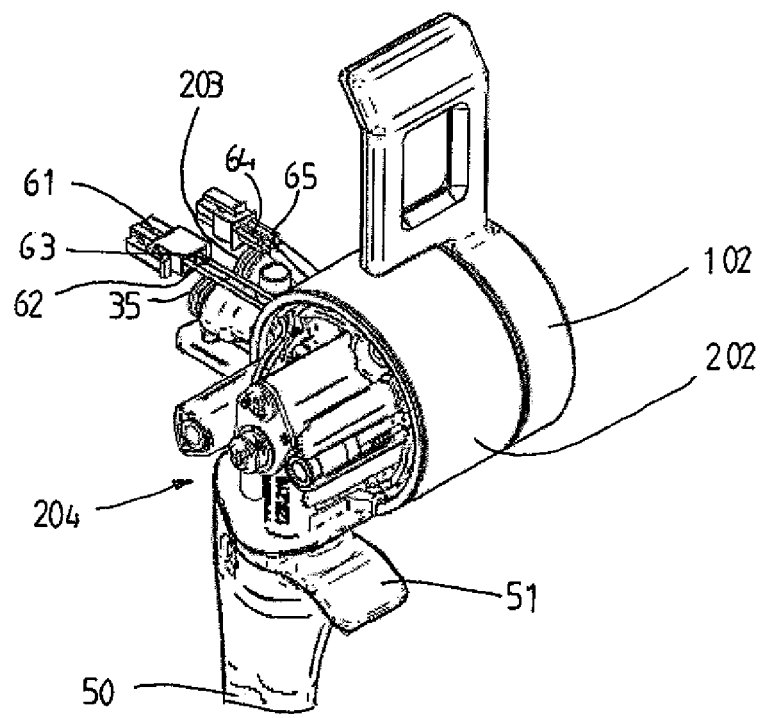
FIG. 5 is a partial section of the operating unit according to FIG. 1 with electrical components.
Figure 6:
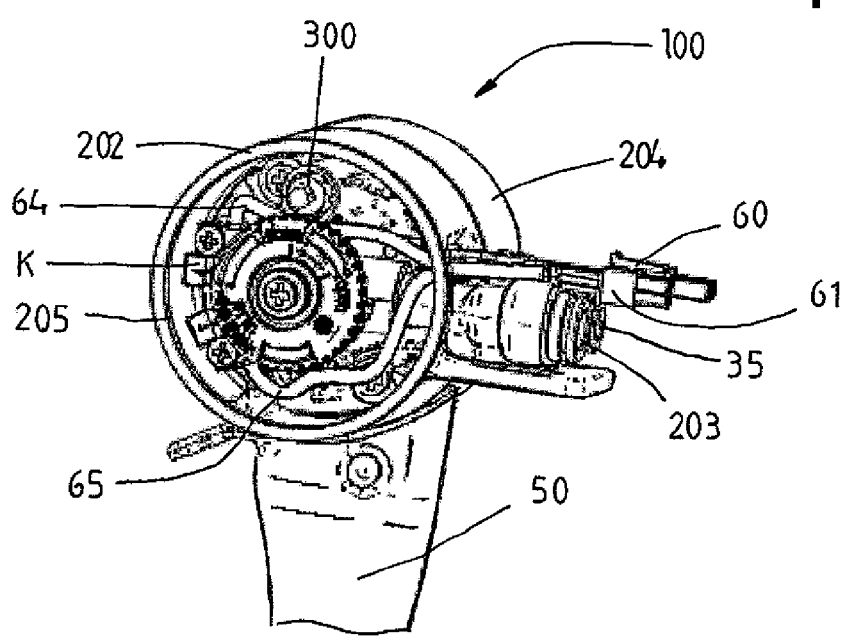
FIG. 6 is a partial section of the operating unit according to FIG. 1 from the opposite side with the electrical components.

FIG. 5 and FIG. 6 show electrical components of the operating unit 100, from which an electrical connection 60 with the lines 62, 63 connect a temperature sensor T integrated at the lower end of the steam lance 50 with an electronic control unit S, also not shown, for measuring the temperature of the milk.

The further electrical connection 61 inside the sleeves 102, 202 connects an electrical component K integrated in the sleeves 102, 202 to the electronic control unit S for direction detection of the deflection of the operating element 101 with the lines 64, 65. Such an electrical component K may be a simple electrical switch or a sensor that can detect this direction of the deflection of the operating element 101.

Figure 7:
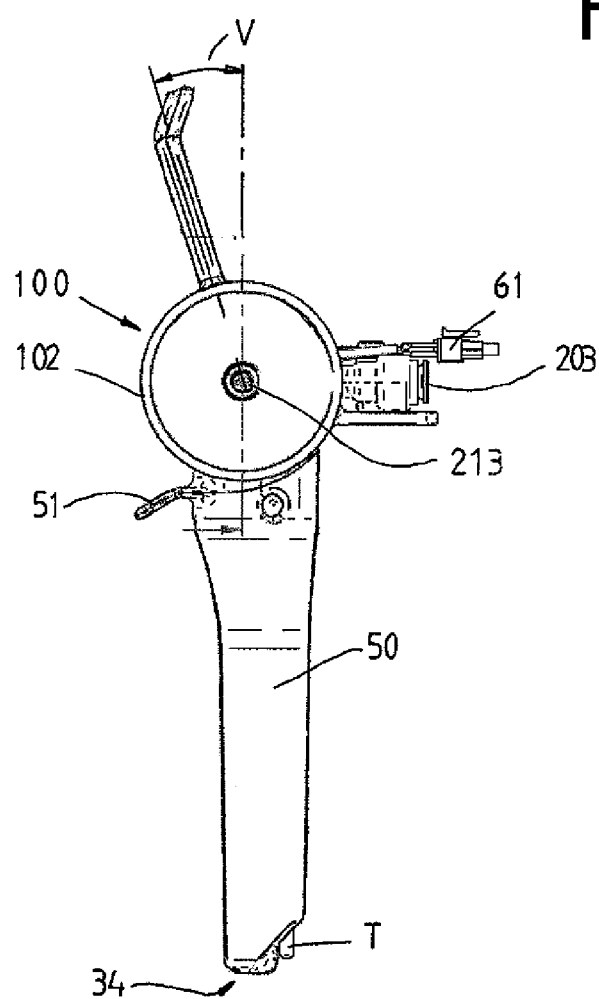
FIG. 7 is an operating element in a further predefined position additional to the basic position.

FIG. 7 shows the operating element 101 of the operating unit 100 in a preset position, in which a certain quantity of steam is discharged. The operating element 101 is deflected from the basic position by a specific angle, for example 17°, when viewed from the vertical axis V.

Figure 8:
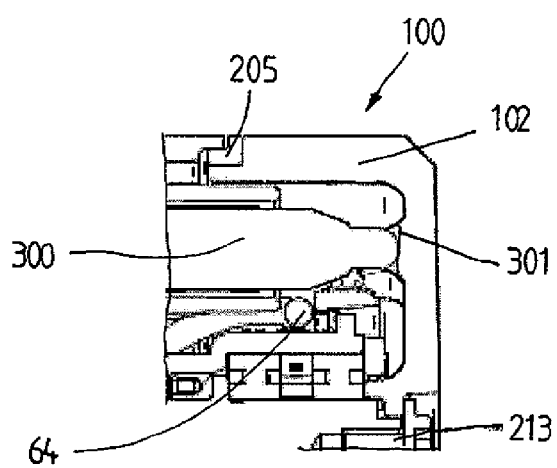
FIG. 8 is a partial section of the sleeve with the pin according to FIG. 3.

FIG. 8 shows the sleeve 102 and the pin 300 located on a first stage of the partially stepped progression 304 shown in the cross section of the profile 301, which corresponds to a preset position with a certain quantity of steam.

Figure 9:
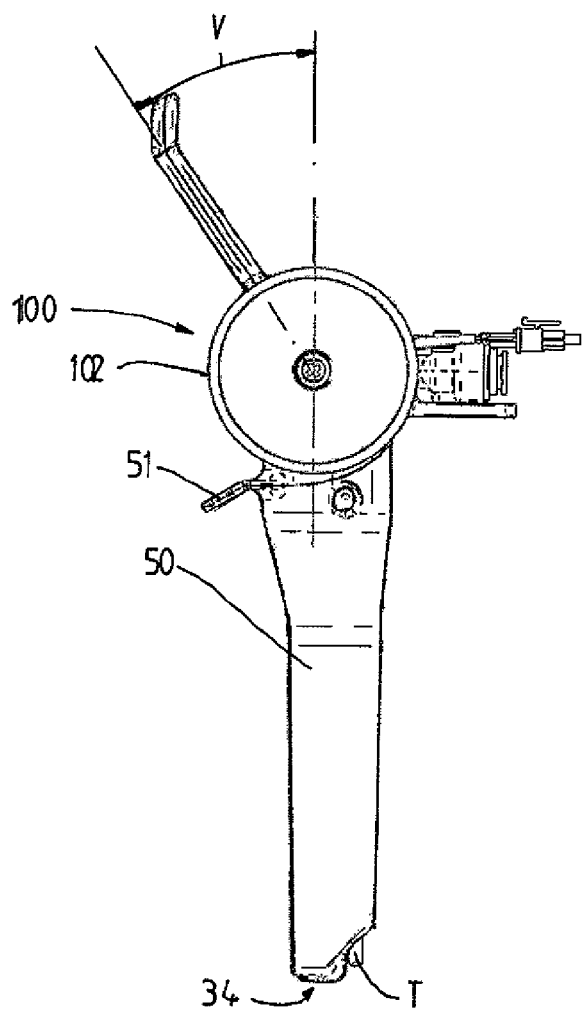
FIG. 9 is the operating element in another displacement in the opposite direction.

According to FIG. 9, the operating element 101 is pivoted into a preset position as a second stage, in which it is rotated through an angle of, for example, 34° from the basic position; in this second stage, the discharge of steam takes place as a greater quantity per unit time than in the first stage. This quantity is set so that the milk in the cup or vessel is heated in an approximately ideal time period in which it should prevent the milk from being heated too quickly.

With the deflection angles of 17° and 34° shown, a user can switch from one step to the other with a quick hand movement. The deflection angles are also determined according to the length of the operating element 101 and its mounting on the operating unit 100. With both a mechanical and an electrical control of the proportional valve 210, an opening width of the proportional valve 210 can be carried out in proportion to the deflection of the operating element 101.

Figure 10:
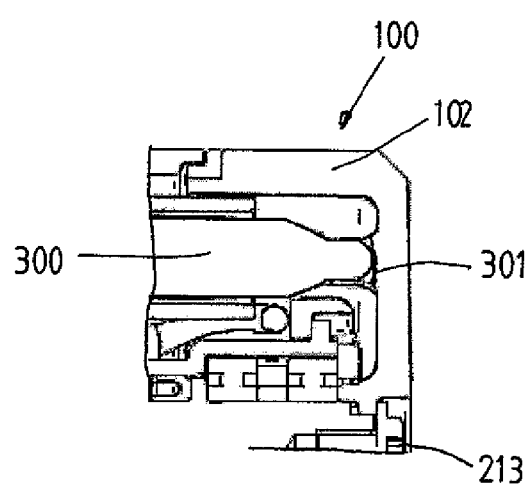
FIG. 10 is a partial section of the sleeve with the pin according to FIG. 3.

FIG. 10 shows the sleeve 102 and the pin 300 on the second stage of the step-like course 304 of the profile 301, which corresponds to of the preset position of the operating element 101 according to FIG. 9 for the specified quantity of steam.

Figure 11:
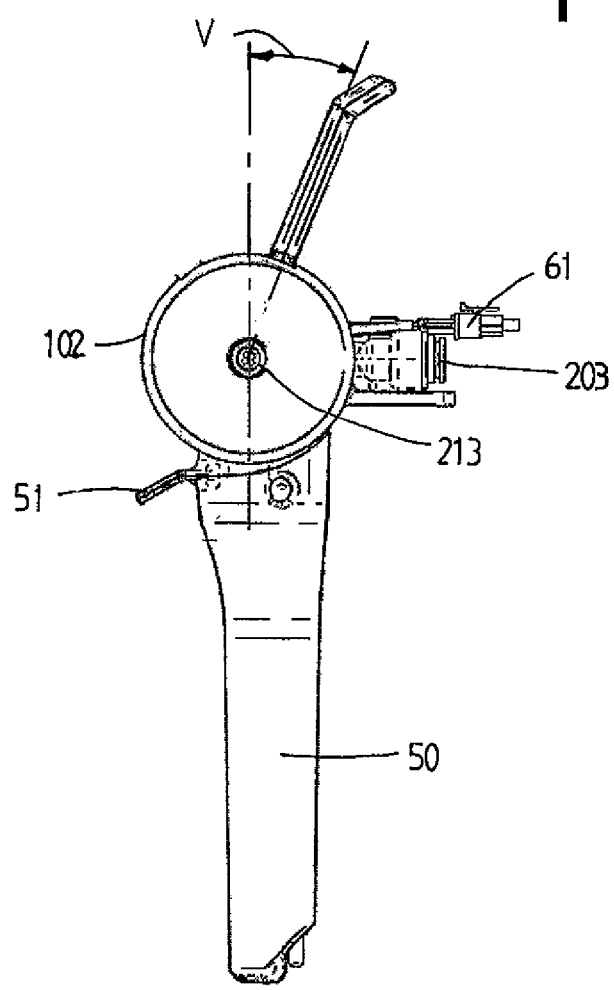
FIG. 11 is the operating element in another displacement in the opposite direction.

FIG. 11 shows the operating element 101 of the operating unit 100 in a different position with a deflection in the opposite direction to the positions according to FIG. 7 and FIG. 9, around the vertical axis V, which corresponds to the basic position.

Figure 12:
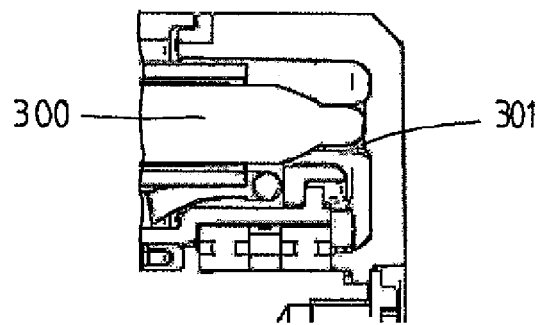
FIG. 12 is a partial section of the sleeve with the pin according to FIG. 3.

FIG. 12 shows the sleeve 102 and the pin 300 on the ramp-like step of the stepped course 304 of the profile 301, in which the operating element 101 can be deflected to select the quantity of steam at will, substantially step-by-step, up to the position according to FIG. 11.

Figure 13:
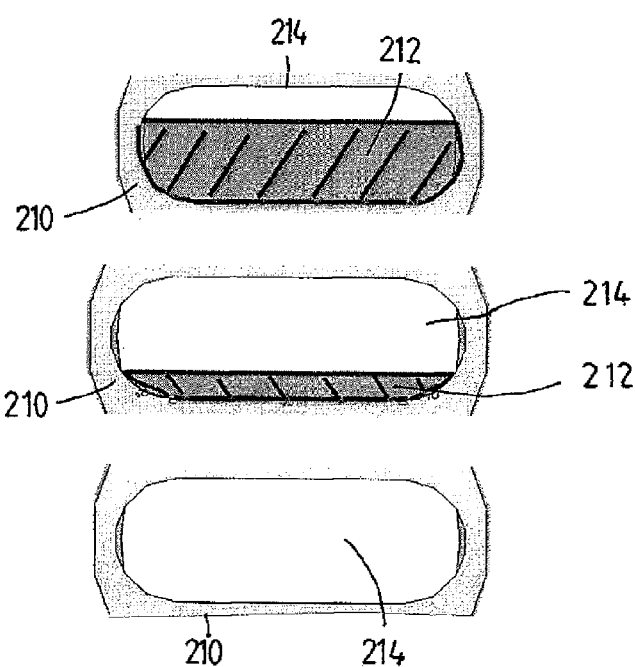
FIG. 13 is cross-sections of the valve opening for the steam outlet of the operating unit.

FIG. 13 shows the cross-section of the opening 214 of the valve sleeve of the proportional valve 210 in the stages of almost closed, half open in the first stage at 17° and with the valve 210 fully open. Preferably, the cross-section of the opening 214 and the opening or closing valve pin 212 have an approximately rectangular shape, so that an approximately linear variation of the flow rate of the steam is obtained. In addition, due to the displacement direction of the valve pin 212 transverse for the longitudinal extension of the opening 214, only a short displacement of the operating element 101 from the closed position to the fully open position and vice versa is required.

Figure 14:
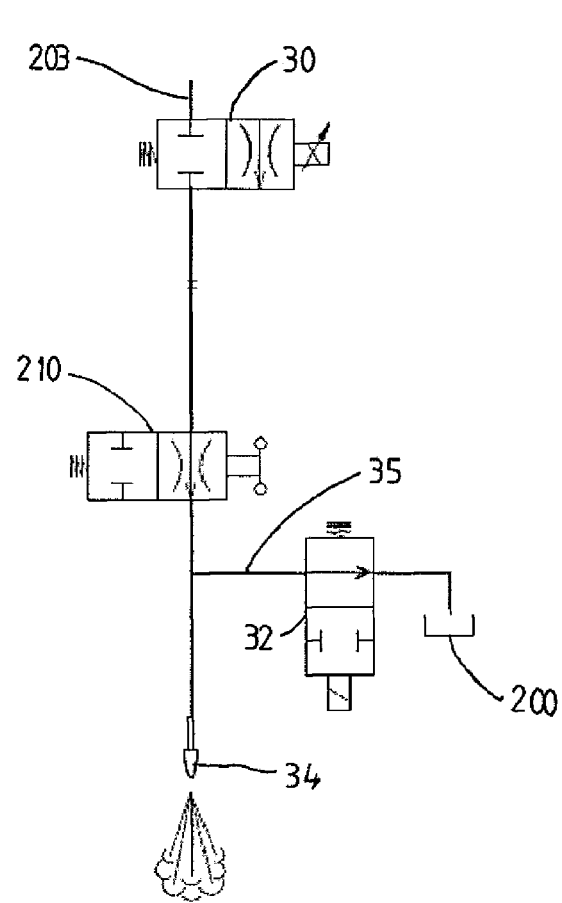
FIG. 14 is a hydraulic plan of the operating unit according to FIG. 1.

FIG. 14 shows a hydraulic scheme with a media supply line 203, a main valve 30, a proportional valve 210, a venting line 35, a valve 32 and a steam outlet opening 34 of the steam lance 50 (not shown). The media line 203 is used to supply steam and/or air for heating or foaming of milk and connects a steam boiler located in the coffee machine (not shown) with the main valve 30 and the proportional valve 210, which in turn is connected to the steam outlet opening 34 of the steam lance 50.

The main valve 30 opens or closes after actuation of the operating element 101. With preset positions, previously selected with the operating element 101, for example at a deflection angle of 17° or 34°, the main valve 30 remains open to release steam until this electronic control unit S closes the main valve 30 again when the temperature of the milk to be foamed, as measured by the temperature sensor T, reaches a target value.

The operating element 101 remains in the deflected position when the main valve 30 is automatically closed by the electronic control unit S and must be returned manually to the basic position. This could also be done automatically, within the scope of the invention, by a suitable electrical and/or mechanical device.

The proportional valve 210 is controlled by the operating element 101 for the discharge of a quantity of steam at a desired steam output, depending on a position of the operating element 101. In addition, regulation of an adjustable steam temperature is possible though admixture of air to the quantity of steam by the proportional valve 210 is possible within the scope of the invention.

The vent line 35 connects the valve 32 to the interior of the coffee machine 200 and is open there so that, when the valve 32 is open, air can flow from the interior of the coffee machine 200 into the steam lance 50, in order to create a vacuum and consequently prevent a return of milk into the steam lance 50, since the hot milk would cake in the steam lance 50 and block it. The valve 32 opens for venting when the main valve 30 or the proportional valve 210 closes, and the valve 32 closes for venting when the proportional valve 210 opens.

The invention is adequately demonstrated with the exemplary embodiment. However, it could be exemplified by other variants. Thus, the operating control could theoretically also be adjusted linearly in a rail or similar or by a rotation in its axis direction, instead of a swivel motion.

Advantageously these two lock-in positions are provided when rotating the operating element. However, only one or the other could be provided.

The invention claimed is:

1. Operating arrangement for controlling media being delivered from a media supply line, comprising:
    a fixed sleeve,
    an adjustable outlet head,
    a steam lance attachable to said outlet head and from which steam is operatively delivered,
    a manually adjustable operating element that controls delivery of steam from said steam lance, and
    an adjustable sleeve coupled to said operating element,
    said operating element having a basic position in which steam is not discharged from said steam lance and being movable with said adjustable sleeve relative to said fixed sleeve in a first direction from the basic position into at least one first position in each of which a specific quantity of steam is operatively delivered from said steam lance, and in a second direction from the basic position opposite to the first direction to operatively deliver a variable quantity of steam from said steam lance dependent on movement in the second direction from the basic position.

2. The operating arrangement of claim 1, wherein said outlet head and said adjustable sleeve are each rotatably mounted relative to said fixed sleeve.

3. The operating arrangement of claim 1, wherein said outlet head and said adjustable sleeve are on opposite sides of said fixed sleeve.

4. The operating arrangement of claim 1, wherein said adjustable sleeve comprises a shaped section, the operating arrangement further comprising:
    a spring situated within said fixed sleeve, and
    an axially adjustable pin acted on by said spring and operatively connected to said shaped section.

5. The operating arrangement of claim 4, wherein said shaped section includes a step for the basic position of said operating element, a step-shaped progression extending from said step in one direction for the at least one first position to enable the specific quantity of steam to be operatively delivered from said steam lance in each of the at least one first position, and a ramp-shaped gradient extending from said step in an opposite direction to enable delivery of the variable quantity of steam from said steam lance dependent on movement of said operating element in the second direction from the basic position.

6. The operating arrangement of claim 1, further comprising a proportional valve in said fixed sleeve and said adjustable sleeve, said proportional valve including a valve pin controlled by movement of said operating element for controlling flow of steam from the media supply line into said steam lance.

7. The operating arrangement of claim 6, wherein said proportional valve includes a valve sleeve having an opening with a generally rectangular cross-section, said valve pin having a generally rectangular form.

8. The operating arrangement of claim 7, wherein said adjustable sleeve is mechanically connected to said valve pin.

9. The operating arrangement of claim 6, wherein said proportional valve is in a center of said fixed sleeve and said adjustable sleeve.

10. The operating arrangement of claim 1, further comprising a venting device with a vent valve fluidly coupled to a passage of steam through said steam lance, said venting device being configured to, when supply of media to said steam lance is interrupted, supply atmospheric air and thereby prevent flow of fluid through an outlet of said steam lance into said steam lance.

11. The operating arrangement of claim 1, wherein said operating element is configured to, upon manual release of said operating element, automatically pivot back to the basic position from the at least one first position and from a position in which it has been moved in the second direction.

12. The operating arrangement of claim 1, wherein said operating element is configured to be returnable manually to the basic position from the at least one first position and from a position in which it has been moved in the second direction.

13. The operating arrangement of claim 1, wherein the at least one first position of said operating element comprises two successive engaged first positions which for the delivery of two different quantities of steam is operatively delivered from said steam lance.

14. The operating arrangement of claim 1, wherein when said operating element is moved in the second direction from the basic position, the variable quantity of steam being delivered from said steam lance varies from a minimum to a maximum and said operating element is configured to, upon manual release of said operating element, automatically pivot back to the basic position from a position in which it has been moved in the second direction.

15. The operating arrangement of claim 1, wherein movement of said operating element with said adjustable sleeve relative to said fixed sleeve in the first direction from the basic position to the at least one first position and in the second direction from the basic position to the position in which it has been moved in the second direction is obtained by engaging means for variably engaging said adjustable sleeve to said fixed sleeve.

16. The operating arrangement of claim 15, wherein said engaging means comprise:
a shaped section on said adjustable sleeve,
a spring situated within said fixed sleeve, and
an axially adjustable pin acted on by said spring and operatively connected to said shaped section.

17. The operating arrangement of claim 16, wherein said shaped section includes a step for the basic position of said operating element, a respective step-shaped progression extending from said step in one direction for the at least one first position to enable the specific quantity of steam to be operatively delivered from said steam lance in each of the at least one first position, and a ramp-shaped gradient extending from said step in the opposite direction to enable delivery of the variable quantity of steam from said steam lance dependent on movement in the second direction from the basic position.

18. The operating arrangement of claim 16, wherein said spring and said pin are axially adjustable in said fixed sleeve perpendicular to said shaped section.

19. A coffee machine, comprising:
the operating arrangement of claim 6,
a steam boiler coupled to the media supply line for providing a supply of steam through the media supply line whereby the media is steam,
a main valve that opens and closes the media supply line,
an electronic control unit electrically connected to the operating arrangement and that controls said main valve, and
a temperature sensor integrated with said steam lance at a lower end thereof for measuring temperature of milk being foamed by the operating arrangement whereby said electronic control unit receives the measured temperature and controls said main valve at least partly based therein.

20. The coffee machine of claim 19, wherein said control unit is configured to close said main valve when actual temperature detected by said temperature sensor exceeds a preset target temperature.

* * * * *

UNITED STATES PATENT AND TRADEMARK OFFICE
CERTIFICATE OF CORRECTION

| | |
|---|---|
| PATENT NO. | : 11,576,522 B2 |
| APPLICATION NO. | : 16/631886 |
| DATED | : February 14, 2023 |
| INVENTOR(S) | : Arian Steiner |

It is certified that error appears in the above-identified patent and that said Letters Patent is hereby corrected as shown below:

In the Claims

Claim 19:
Column 8, Line 19, change "claim 6" to --claim 1--.

Signed and Sealed this
Twenty-first Day of March, 2023

Katherine Kelly Vidal
*Director of the United States Patent and Trademark Office*